J. I. G. COLLINS.
DUPLEX ECCENTRIC VALVE MOTION.
No. 8,752. Patented Feb. 24, 1852.
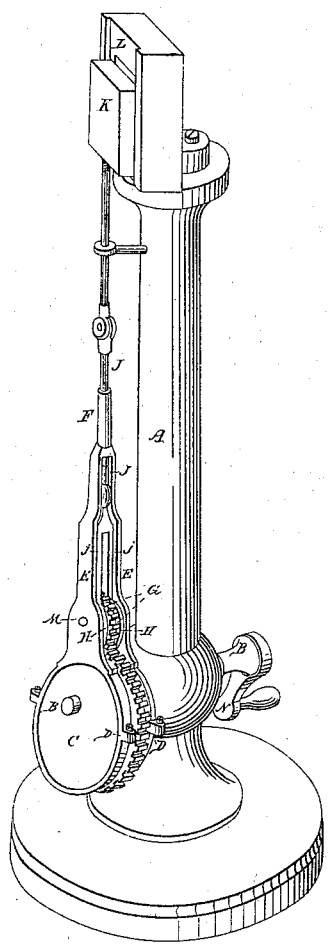

UNITED STATES PATENT OFFICE.

JOHN I. G. COLLINS, OF CHESTER, PENNSYLVANIA.

DUPLEX ECCENTRIC VALVE-MOTION.

Specification of Letters Patent No. 8,752, dated February 24, 1852.

*To all whom it may concern:*

Be it known that I, JOHN I. G. COLLINS, of Chester, in the county of Delaware and State of Pennsylvania, have invented a new and useful machine for giving a new motion or action to slide and other valves of steam-engines, called the double-action extension and contraction motion, of which the following, in connection with the accompanying drawings, is a full and exact description.

Letter A, as on drawing represents a column and to which is affixed the whole of the machine.

Letter B represents a shaft which passes through column A, near its base and to represent a driving shaft of a steam engine. On said shaft is fastened an eccentric wheel lettered C, with cogs sixty in number formed and arranged so as to serve both as a driving wheel and eccentric wheel said eccentric wheel having slips or straps attached lettered D, D, to which is affixed and made a part of the same a guard or framing lettered E, E, and constructed so as one part of it to form a socket lettered F. The other part of the framing is constructed so as to admit of a cog wheel lettered G, which contains twenty cogs. On the sides of said wheel are eccentric wheels on which are clips or straps lettered H, H, and to which is attached a connecting framing lettered I, I, formed and arranged so as to give the vibrating motion derived from the eccentric wheels attached to cog wheel G. To the connecting rod J said rod passing through socket F and which serves as a guard for it, said rod J giving motion to the slide valve lettered K, said valve working on openings in surface lettered L and which are to represent the slide valve and openings of a steam engine. The cog wheel G being held in gear with the cogs on eccentric wheel C by a shaft or axle passing through its center and lettered m and secured to the framing E, E, thereby the cogwheel, G, receives the vibrating motion caused by the revolving of eccentric wheel, C, and which at the same time gives motion to cogwheel, G, by means of its cogs being geared with those of the eccentric wheel, C, and causing cogwheel, G, to make three revolutions for eccentric wheel, C, one, the throw of which is double the length of that derived from the eccentrics on cogwheel, G.

Letter, N, represents the driving crank of a steam engine and fastened to shaft, B, at that point so that the center or meridian of the stroke is when the driving crank, N, is perpendicular with the column, A, the valve, K, being then on the point of opening the thoroughfare in surface L, for the admission of steam, and which is opened by moving the crank one-sixth of its circuit in one stroke where it continues open one-sixth more then commences shutting and is shut off at half stroke leaving the exhaust open the remainder of the stroke.

What I claim and desire to secure by Letters-Patent of the United States—

The employment of cogs on or to eccentric wheels for giving motion to eccentrics or their equivalents on a second motion in combination with the guard or framing attached to the clips or straps of the driving eccentric and so formed and arranged so as to unite both vibrating motions derived from the driving and driven eccentrics into one motion for working the slide and other valves of steam engines in the manner and for the purpose as specified.

In witness whereof I have hereunto subscribed my name this twenty-sixth day of January one thousand eight hundred and fifty-two, in the presence of two witnesses.

JOHN I. G. COLLINS.

Witnesses:
F. FAIRLAMD,
PETER N. GAMBLE.